United States Patent Office 3,133,910
Patented May 19, 1964

3,133,910
TETRAZAPOLYMETHINE DYES
Hans Baumann and Johannes Dehnert, Ludwigshafen (Rhine), Germany, assignors to Badische Anilin- & Soda-Fabrik Aktiengesellschaft, Ludwigshafen (Rhine), Germany
No Drawing. Filed May 15, 1961, Ser. No. 109,858
Claims priority, application Germany May 20, 1960
3 Claims. (Cl. 260—146)

This invention relates to new tetrazapolymethine dyes and to a process for their production.

The invention relates especially to dyes of the general formula:

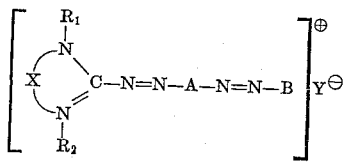

in which $R_1$ and $R_2$ denote short-chain alkyl and/or aralkyl radicals, A denotes a p-phenylene or p-naphthylene radical which may contain further radicals but is free from sulfonic acid groups, X denotes one of the divalent radicals

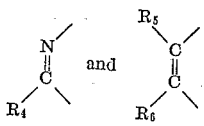

Y denotes the equivalent of an anion, B denotes the radical of a compound capable of coupling and free from sulfonic acid groups, $R_4$ represents hydrogen or a short-chain alkyl group or an aryl group, $R_5$ denotes hydrogen or a short-chain alkyl group or an aryl group and $R_6$ denotes hydrogen or a short-chain alkyl group or an aryl group.

We have found that valuable tetrazapolymethine dyes are obtained by diazotizing a salt of an aminoazo compound of the general formula:

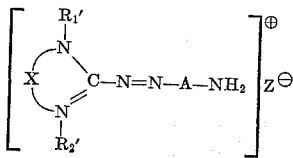

in which $R_1'$ is a hydrogen atom, a short-chain alkyl radical or an aralkyl radical, $R_2'$ is a hydrogen atom, a short-chain alkyl radical or an aralkyl radical, A is a p-phenylene or p-naphthylene radical which is free from sulfonic acid groups but may contain other radicals, X is one of the divalent radicals:

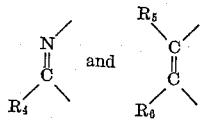

Z is the equivalent of an anion, $R_4$ is hydrogen or a short-chain alkyl, aryl or carboxyl group, $R_5$ is hydrogen or a short-chain alkyl or aryl radical and $R_6$ is hydrogen or a short-chain alkyl or aryl radical, coupling the resultant diazonium compound with a compound free from sulfonic acid groups and capable of coupling and, when $R_2'$ stands for a hydrogen atom, converting the coupling product into the corresponding quaternary salt by treatment with alkylation agents.

The diazotization and coupling are carried out in the usual way in aqueous solution or suspension.

The alkylation is carried out in the usual way, for example in chloroform at the boiling temperature or in o-dichlorobenzene at 80° to 90° C.

The above-mentioned salts of aminoazo compounds, in so far as they belong to the triazole series, are obtained by coupling diazotized 3-amino-1,2,4,-triazole or its alkyl, aryl or carboxyl derivatives substituted in 5-position with aminobenzenes or aminonaphthalenes which couple in p-position to the amino group.

Suitable diazotizable 3-amino-1,2,4-triazole derivatives include 3-amino-1,2,4-triazole, 3-amino-5-methyl-1,2,4-triazole, 3-amino-5-phenyl-1,2,4-triazole and 3-amino-1,2,4-triazole-5-carboxylic acid. The aminobenzenes or aminonaphthalenes coupling in p-position to the amino group may contain substituents, such as low molecular weight alkyl, alkoxy, halogen or acylamino. Examples are aminobenzene, phenylaminomethane sulfonic acid, 1-amino-3-methylbenzene, 1-amino-3-methoxybenzene, 1-amino-3-acetylaminobenzene, 1-amino-2,5-diethylbenzene, 1-amino-2-methoxy-5-methylbenzene, 1-amino-2-methoxy-5-chlorobenzene, 1-amino-2-methoxy-5-acetylaminobenzene, 1-amino-2,5-diethoxybenzene, 1-amino-naphthalene, 1-amino-5-hydroxynaphthalene and 1-amino-2-ethoxynaphthalene. Of these, the compounds of the benzene series are preferred.

The salts of the above-mentioned aminoazo compounds which belong to the imidazole series can be obtained by coupling diazotized p-nitro- or p-acetylamino-aminobenzenes or -amino-naphthalenes with imidazole or its derivatives substituted in 4- and/or 5-position by alkyl and/or aryl radicals, treating the coupling product if necessary with alkylation agents, and converting the nitro or acetylamino group into an amino group by reduction or saponification in the usual way.

The diazotizable p-nitro- or p-acetylamino-aminobenzenes or -aminonaphthalenes may be substituted by nonionic groups. They include in particular the following compounds: 1-amino-4-nitrobenzene, 1-amino-2-chlor-4-nitrobenzene, 1-amino-2-methoxy-4-nitrobenzene, 1-amino-2,5-dimethoxy-4-nitrobenzene, 1-amino-2-methyl-5-methoxy-4-nitrobenzene, 1-amino-4-formylaminobenzene, 1-amino-4-acetylaminobenzene, 1-amino-4-oxalylaminobenzene, 1-amino-4-nitronaphthalene and 1-amino-4-oxalylaminonaphthalene. Imidazole derivatives capable of coupling include imidazole, 4-methylimidazole, 4,5-tetramethylene-imidazole, 4-methyl-5-phenylimidazole, 4,5-diphenylimidazole and 4-phenyl-5-(4-dimethylaminophenyl)-imidazole.

Compounds free from sulfonic acid groups and capable of coupling, which are to be reacted with the diazotized aminoazo compounds include the coupling components free from sulfonic acid groups usual in azo chemistry. Examples are aliphatic enols or enamines, such as acetoacetic acid phenylamide and acetoacetic acid - (2 - methoxyphenylamide), aromatic compounds which couple in o- or p-position to a hydroxy or amino group, such as hydroxybenzene, 1,3-dihydroxybenzene, methylhydroxybenzenes, hydroxydimethylbenzenes, tertiary-butylhydroxybenzenes, 1-amino-3-hydroxybenzene,
1-diethylamino-3-hydroxybenzene,
1-acetylamino-2- or -3-hydroxybenzene,
3-hydroxydiphenylamine,
2-hydroxymethylbenzene-1-carboxylic acids,
1,5-dihydroxynaphthalene,
8-carbomethoxyamino-2-hydroxynaphthalene,
1-amino-3-methylbenzene,
1-dimethylaminobenzene,
1-diethylamino-3-methylbenzene,
1-[bis-(2-hydroxyethyl)-amino]-3-chlorbenzene,
1-[bis-(2-cyanoethyl)-amino]-benzene,
1-N-butyl-N-carbomethoxyethylaminobenzene,
N-ethyl-N-(2-dimethylaminoethyl)-aminobenzene,
1- or 2-aminonaphthalene,
2-ethylaminonaphthalene,
1-amino-5-hydroxynaphthalene,
N-ethyldiphenylamine, or heterocyclic enols or enamines, such as 3-methylpyrazolone-(5),
1-phenyl-3-methylpyrazolone-(5),
1-phenyl-3-methyl-5-aminopyrazole,
1-phenyl-3-carbethoxypyrazolone-(5),
1-(2-methylphenyl)-3-methylpyrazolone-(5),
2,4-dihydroxyquinoline,
4-hydroxyindazole,
8-hydroxyquinoline,
3-hydroxythionaphthene-2-carboxylic acid,
imidazole, 4,5-diphenylimidazole,
1,3,3-trimethyl-2-methylene-indoline,
2,3,3-trimethyl-5-chlorindolenine,
2-phenylindole, 1-methyl-2-phenylindole and
2-methylindoline.

The tetrazapolymethine dyes formed are conveniently isolated by adding mineral acids to the reaction mixtures in the form of their salts of the general formula:

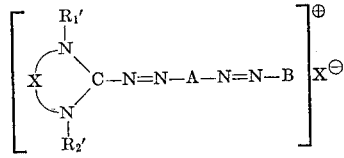

in which $R_1'$, $R_2'$, X and A have the meanings given above, B denotes the radical of a compound capable of coupling which is free from sulfonic acid groups, and Y denotes the equivalent of an anion. In so far as $R_2'$ in this formula stands for a hydrogen atom, the coupling products are converted into the corresponding quaternary salts by treatment with akylating agents. The water-solubility of the dyes is considerably increased by the alkylation. Alkylating agents include for example methyl iodide, ethyl bromide, benzyl chloride, toluene sulfonic acid methyl ester or chloroformic acid esters and especially dimethyl sulfate and diethyl sulfate. Dimethyl sulfate is preferred. The alkylation is carried out in aqueous solution or suspension or in organic solvents such as benzene, toluene, chlorobenzene, methylene chloride chloroform, carbon tetrachloride, acetone, tetrahydrofurane, formamide or dimethylformamide in the presence of acid-binding substances, such as potassium hydrogen carbonate, sodium carbonate, sodium acetate, magnesium oxide or calcium carbonate, the carboxyl group at the triazole radical of the compounds containing the triazole-5-carboxylic acid being split off. The alkylation products are separated by filtration or distillation of the solvent and preferably dissolved in and reprecipitated from dilute mineral acid. They are preferably precipitated from these solutions with neutral salts, such as sodium chloride, or with oxalic acid, perchloric acid and/or zinc chloride.

The nature of the anions from which the equivalents represented in the formulae by Z or Y are derived is without importance for the tinctorial properties of the products of the process. The anions which are colorless may be derived from inorganic or organic complex acids. Examples are fluoride, chloride, bromide, iodide, sulfate, hydrogen sulfate, nitrate, phosphate, hydrogen phosphate, dihydrogen phosphate, perchlorate, formate, acetate, chloroacetate oxalate, tetrafluoroborate, tetrachlorozincate, methosulfate and tosylate anions. Dyes of the said kind which contain chloride, bromide, sulfate, perchlorate or tetracolroozincate as anion are preferred, especially those which contain chloride or tetrachlorozincate anions.

The tetrazapolymethine dyes prepared according to the new process are suitable for dyeing and printing leather and textile materials, such as filaments, flock, fibres, woven and non-woven textiles of wool, silk, cellulose, for example mordanted cotton, paper, jute and coir and cellulose acetate. The dyes may also be used for the preparation of lacquers and printing compositions. The dyes have special suitability for dyeing and printing textile materials of synthetic linear polyamides, such as poly-ϵ-caprolactam and the poly-hexamethylene diammonium adipate, synthetic linear polyesters, such as polyethylene terephthalate and polyhexahydroterephthalyl terephthalate and copolymers containing acrylonitrile or 1,1-dicyanoethylene, such as polyacrylonitrile, poly-1,1-dicyanoethylene and copolymers of acrylonitrile and/or 1,1-dicyanoethylene with other polymerizable compounds, such as vinyl chloride and vinyl acetate, the tinctorial nature of the textile materials being determined by the content of acrylonitrile or 1,1-dicyanoethylene. Especially on the last-mentioned textile materials, dyeings and prints are obtained with the dyes obtainable according to this invention in deep shades and with outstanding fastness properties.

The invention is illustrated by, but not limited to, the following examples. The parts specified in the examples are parts by weight. Percentages are percentages by weight.

*Example 1*

10.5 parts of sodium nitrite are added to a solution of 19.2 parts of 3-amino-1,2,4-triazole-5-carboxylic acid and 12 parts of a 50% aqueous sodium hydroxide solution in 400 parts of water. The mixture is cooled to $-5°$ C. and, while stirring, 120 parts of 5 N hydrochloric acid are added. The mixture is stirred for two hours at 0° C., any excess of nitrous acid present destroyed by adding urea, and a solution of 23.5 parts of 1-amino-2,5-dimethoxybenzene and 40 parts of 5 N hydrocoloric acid in 300 parts of water allowed to flow in. When coupling is complete, the aminoazo compound of the formula:

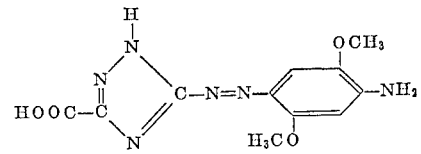

obtained is deposited by adding 30 parts of a 50% aqueous zinc chloride solution and 150 parts of sodium chloride, filtered off and washed with 10% aqueous sodium chloride solution until the washing water no longer contains any of the coupling components used.

The moist filter residue is dissolved in 1100 parts of water together with 28 parts of a 50% aqueous sodium hydroxide solution, 10.2 parts of sodium nitrite are added to this solution, the whole is cooled to 0° C., and, while stirring, 80 parts of 5 N hydrochloric acid are added. The diazotization mixture is stirred for several hours at 0° C. to 5° C., any nitrous acid present after the end of the diazotization is destroyed by adding urea and the diazo solution is allowed to flow into a solution of 25.5 parts of 1-dimethylamino-3-methylbenzene and 40 parts of 5 N hydrochloric acid in 200 parts of water. Then a solution of 41 parts of sodium acetate in 160 parts of water is slowly added to the coupling solution. When coupling is complete, the deposited dye is filtered off, washed with water and dried at 50° C. under reduced of sodium chloride. After filtration and drying at 50° C. under reduced pressure, a dye of the formula:

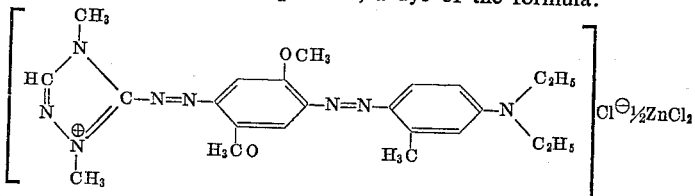

pressure. 67 parts of dye are obtained; it dissolves in alcohol or hot water with a violet color. By adding hydrochloric acid, a greenish-blue dye salt of the formula:

is obtained which dissolves in water with a reddish-blue color changing to greenish-blue upon addition of hydrochloric acid. The dye dyes polyacrylonitrile fibers blue

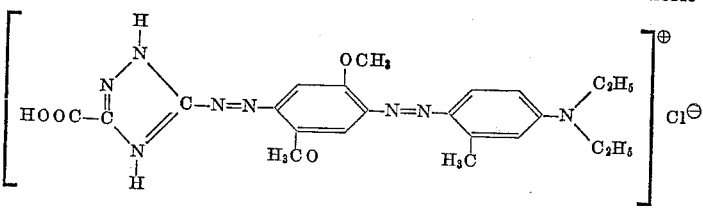

is formed therefrom.

20 parts of the dye obtained and 2.5 parts of magnesium oxide are stirred with 300 parts of chloroform. 15 parts of dimethyl sulfate are added to this mixture and the whole is heated under reflux for six hours while stirring. After cooling the mixture, an equal volume of benzene is added and the precipitate filtered off and dried. The reaction product which contains the methosulfate of the dye is dissolved in a hot mixture of 10 parts of 10 N hydrochloric acid and 500 parts of water, the solution is filtered, cooled and the dye then precipitated from the filtrate with 10 parts of zinc chloride and 120 parts shades of very good fastness properties from an acetic acid or sulfuric acid bath.

If diethyl sulfate be used instead of dimethyl sulfate, a similar, ethylated dye is obtained. Instead of preparing the hydrochloride or the chlorine-zinc double salt, the corresponding bromine-zinc double salt can be obtained by adding hydrobromic acid and zinc bromide. By using sulfuric acid, nitric acid or perchloric acid, the corresponding sulfate, nitrate or perchlorate is obtained.

Similar dyes, listed in the following table, are obtained in the same way by alkylation. The right-hand column of the table gives the shade of a dyeing on polyacrylonitrile obtained with the finished dye.

| Example | Disazo compound | Shade of dyeing on polyacrylonitrile |
|---|---|---|
| 2 | (structure) | blue-violet. |
| 3 | (structure) | reddish-blue. |
| 4 | (structure) | blue. |
| 5 | (structure) | blue. |

| Example | Disazo compound | Shade of dyeing on polyacrylonitrile |
|---|---|---|
| 6 | 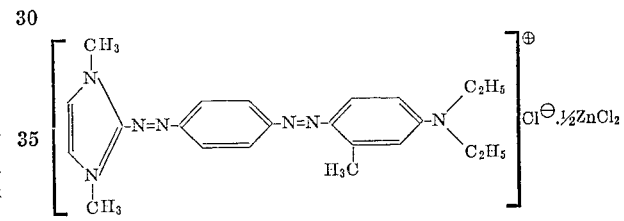 | greenish-blue. |

Example 7

An aqueous solution of 7 parts of sodium nitrite is added to a mixture, cooled to 0° C., of 15 parts of 1-amino-4-acetylaminobenzene, 25 parts of 10 N hydrochloric acid and 150 parts of ice-water. When diazotization is complete, any excess of nitrous acid present is destroyed with urea and the diazo solution allowed to flow into an ice-cooled solution of 9 parts of imidazole in 150 parts of water. In the course of 30 minutes, a solution of 7.2 parts of sodium hydroxide in 80 parts of water is added to the coupling solution and, after another 30 minutes, 20 parts of 30% acetic acid. The reaction product is filtered off and dried at 50° C. under reduced pressure.

23 parts of the powdered reaction product are stirred with 400 parts of chloroform and then 4.6 parts of magnesium oxide and 31 parts of dimethyl sulfate are added. The mixture is boiled under reflux for eight hours while stirring, allowed to cool and the reaction product filtered off and washed with benzene. The dye salt obtained is boiled together with 500 parts of water and 40 parts of 10 N hydrochloric acid for an hour under reflux and the mixture then cooled to 70° C. The solution which contains the dye salt of the formula:

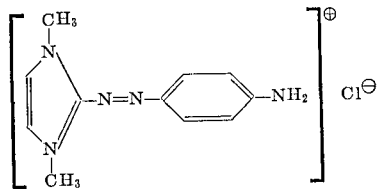

dissolved therein is cooled to about 0° C., an aqueous solution of 7 parts of sodium nitrite allowed to flow in and the whole stirred at 0° C. until diazotization is complete. The diazo solution is filtered and allowed to flow into a solution of 20 parts of 1-diethylamino-3-methylbenzene and 11 parts of 10 N hydrochloric acid in 200 parts of ice-water. During the coupling, an aqueous solution of 22 parts of sodium acetate is gradually added. When coupling is complete, the solution is filtered and the reaction product precipitated with 40 parts of zinc chloride and 400 parts of a saturated aqueous sodium chloride solution. The dye of the formula:

obtained dyes polyacrylonitrile fibers fast dark blue shades.

The dyes of the following table are obtained in the same way:

| Example | Tetrazapolymethine dye | Shade of dyeing on polyacrylonitrile |
|---|---|---|
| 8 |  | orange-red. |
| 9 |  | navy-blue. |
| 10 |  | violet. |

| Example | Tetrazapolymethine dye | Shade of dyeing on polyacrylonitrile |
|---|---|---|
| 11 | 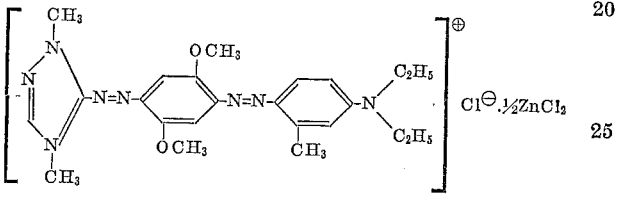 | navy-blue. |

Example 12

A fabric of polyacrylonitrile staple fiber is placed at 60° C. in a dyebath which contains, in 4000 parts of water, 2 parts of 96% sulfuric acid, 20 parts of Glauber's salt and 0.6 part of the dye of the formula:

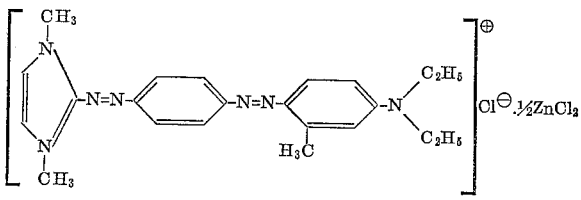

obtained according to Example 1 and the temperature is raised to 85° C. within 15 minutes. The bath is heated to the boiling temperature in the course of 30 minutes and dyeing is continued in the boiling bath for 90 minutes. The fabric is then soaped, rinsed and dried. A blue dyeing is obtained having very good fastness to light and laundering.

Example 13

1 part of the dye of the formula:

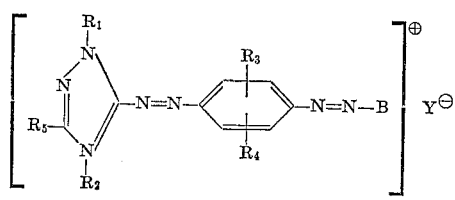

obtained according to Example 2 is made into a paste with 3 parts of the condensation product of 1 mol of sperm oil alcohol and 24 mols of ethylene oxide and 5 parts of 30% acetic acid and dissolved by pouring hot water thereover. The solution is diluted with warm water at 60° C. to 3500 parts by volume. 100 parts of fibers of a copolymer of 95% of acrylonitrile and 5% of butyl methacrylate are dyed therewith as described in Example 12.

A light-fast navy blue dyeing is obtained which has very good fastness to washing and fulling and resistance to steaming.

We claim:

1. A dye of the formula

[structure]

in which:
$R_1$ denotes a substituent selected from the class consisting of methyl, ethyl and benzyl,
$R_2$ denotes a substituent selected from the class consisting of methyl, ethyl and benzyl,
$R_3$ denotes a substituent selected from the class consisting of hydrogen, ethyl, methoxy, ethoxy and chlorine,
$R_4$ denotes a substituent selected from. the class consisting of hydrogen, methyl, ethyl, methoxy, ethoxy and acetylamino,
$R_5$ denotes a substituent selected from the class consisting of hydrogen, methyl and phenyl,
B denotes a coupling component selected from the class consisting of 3-methyl-N-diethylaminobenzene, N-dimethylaminobenzene, N-methyl-2-phenylindole, 3-chloro - N - di-β-hydroxyethylaminobenzene, 1,2-dimethyl-2,3-dihydroindole and 2-methoxy-5-carbomethoxyamino - N - di-β-hydroxyethylaminobenzene, and
Y denotes an anion selected from the class consisting of fluoride, chloride, bromide, iodide, sulfate, hydrogen sulfate, nitrate, phosphate, hydrogen phosphate, dihydrogen phosphate, perchlorate, formate, acetate, chloroacetate, oxalate, tetrafluoborate, tetrachlorozincate, methosulfate and tosylate.

2. The dye of the formula

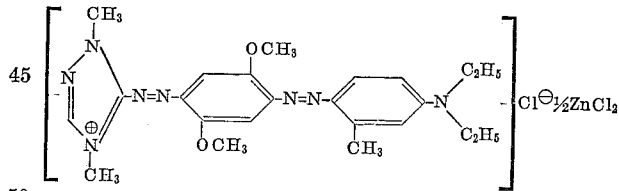

3. The dye of the formula

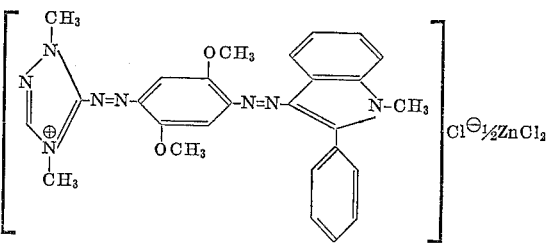

References Cited in the file of this patent

UNITED STATES PATENTS

| 2,346,531 | Allen et al. | Apr. 11, 1944 |
| 2,883,373 | Bossard et al. | Apr. 21, 1959 |
| 2,893,816 | Tsang et al. | July 7, 1959 |

FOREIGN PATENTS

| 837,471 | Great Britain | June 15, 1961 |